(12) United States Patent
Han

(10) Patent No.: US 9,436,007 B2
(45) Date of Patent: Sep. 6, 2016

(54) INTEGRATED CLUSTER AND HEAD-UP DISPLAY DEVICE FOR VEHICLE

(71) Applicant: HYUNDAI MOTOR COMPANY, Seoul (KR)

(72) Inventor: SangJae Han, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 14/555,980

(22) Filed: Nov. 28, 2014

(65) Prior Publication Data

US 2016/0054564 A1 Feb. 25, 2016

(30) Foreign Application Priority Data

Aug. 22, 2014 (KR) ........................ 10-2014-0109924

(51) Int. Cl.
*G02B 27/01* (2006.01)
(52) U.S. Cl.
CPC ....... *G02B 27/0101* (2013.01); *G02B 27/0149* (2013.01); *G02B 2027/0147* (2013.01); *G02B 2027/0154* (2013.01)
(58) Field of Classification Search
CPC .............. G02B 27/01; G02B 27/0101; G02B 27/0103; G02B 27/0149; G02B 27/0179; G02B 27/0189; G02B 2027/0105–2027/0147; G02B 2027/015–2027/0169; G02B 2027/0181–2027/0187; G02B 2027/019–2027/0198
See application file for complete search history.

(56) References Cited

U.S. PATENT DOCUMENTS

| | | | | |
|---|---|---|---|---|
| 6,731,435 B1 * | 5/2004 | Kormos | ............ | G02B 26/0816 345/7 |
| 2002/0075200 A1 * | 6/2002 | Kearns | ............... | G02B 27/0101 345/7 |
| 2006/0215244 A1 * | 9/2006 | Yosha | ................ | G02B 27/0101 359/15 |
| 2014/0092481 A1 * | 4/2014 | Hudson | .................... | G02B 5/02 359/630 |

FOREIGN PATENT DOCUMENTS

| | | | | |
|---|---|---|---|---|
| EP | 2618204 A1 * | 7/2013 | ......... | G02B 27/0101 |
| JP | 2006-103589 A | 4/2006 | | |
| JP | 2006-106254 A | 4/2006 | | |
| JP | 2013-024948 A | 2/2013 | | |
| KR | 10-2012-0020745 A | 3/2012 | | |

* cited by examiner

*Primary Examiner* — Mariceli Santiago
(74) *Attorney, Agent, or Firm* — McDermott Will & Emery LLP

(57) ABSTRACT

An integrated cluster and head-up display device for a vehicle includes a display device and a controller. The display device may have a display area including an area of cluster information and an area of head-up display (HUD) information. The controller is configured to control an operation of the display device.

6 Claims, 5 Drawing Sheets

INTEGRATED CLUSTER AND HEAD-UP DISPLAY DEVICE FOR VEHICLE

CROSS-REFERENCE TO RELATED APPLICATION

This application claims the benefit of priority to Korean Patent Application No. 10-2014-0109924 filed in the Korean Intellectual Property Office on Aug. 22, 2014, the entire contents of which are incorporated herein by reference.

TECHNICAL FIELD

The present disclosure relates to an integrated cluster and head-up display device for a vehicle, and more particularly, to an integrated cluster and head-up display device for a vehicle having multiple optical paths or multiple beam paths.

BACKGROUND

In general, a cluster which provides information on travelling of a vehicle and on operational states associated with an engine, etc. for a driver is installed in front of a driver's seat.

A plurality of gauges are mounted in the cluster. The gauges include a speedometer, a trip meter, a totalizer, an tachometer that indicates a speed of the engine, a fuel gauge that indicates the remaining amount of fuel, a thermometer that indicates a temperature of cooling water, a brake warning lamp, a seat belt alarm light, an anti-lock braking system (ABS) warning light, a traction control system (TCS) warning light, and an indicator which displays operating conditions and alert state of subsystems in the vehicle.

In addition to displaying dial-type gauge information, a recent cluster for the vehicle displays graphical gauge information using a liquid crystal display so that it provides better visibility and much more information.

As vehicles become more sophisticated and have multiple functions, much more information regarding the vehicle should be provided to the driver. Therefore, a method which may display various types of information with optimal layout in the cluster consisting of the liquid crystal display is required.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide an integrated cluster and head-up display device for a vehicle which is capable of displaying cluster information and HUD information to a driver or a user by using a single display device and two optical paths.

According to an exemplary embodiment of the present inventive concept, an integrated cluster and head-up display device for a vehicle includes a display device having a display area including an area of cluster information and an area of head-up display (HUD) information. A controller is configured to control an operation of the display device. The display device may include a liquid crystal display (LCD) device.

The integrated cluster and head-up display device may further include a first optical mirror which reflects the HUD information to a windshield, a second optical mirror which reflects the HUD information to the first optical mirror, and a third optical mirror which displays virtual cluster information by reflecting the cluster information.

When the second optical mirror and the third optical mirror are moved on the display device by a motor, the second optical mirror may reflect the HUD information and the third optical mirror may reflect the cluster information.

The controller may control the display device to deactivate the HUD information and display only the cluster information. The controller may control the display device to deactivate the cluster information and display only the HUD information.

The controller may adjust a resolution of the cluster information area and a resolution of the HUD information area. The controller may control the display device to display the cluster information at a low resolution and display the HUD information at high resolution. The controller may adjust a size of the cluster information area and a size of the HUD information area.

According to the exemplary embodiment of the present inventive concept, the integrated cluster and head-up display device for the vehicle may have advantages of having a combined controller which includes a microcomputer and controls a display device such as a liquid crystal display (LCD). Accordingly, production costs of the integrated cluster and head-up display device may be less than those of a device having a separate-type controller.

When a high-resolution LCD is applied to the present disclosure, the integrated cluster and head-up display device according to an exemplary embodiment of the present inventive concept may effectively provide variable resolution and display high-class contents.

In addition, the present invention uses an integrated type of controller which controls operation of a single display device, and thus may enable effective sharing of show contents between a cluster and a head-up display (HUD).

BRIEF DESCRIPTION OF THE DRAWINGS

A brief description of the drawings will be provided to more sufficiently understand the drawings which are used in the detailed description of the present disclosure.

DETAILED DESCRIPTION

Figure 1:
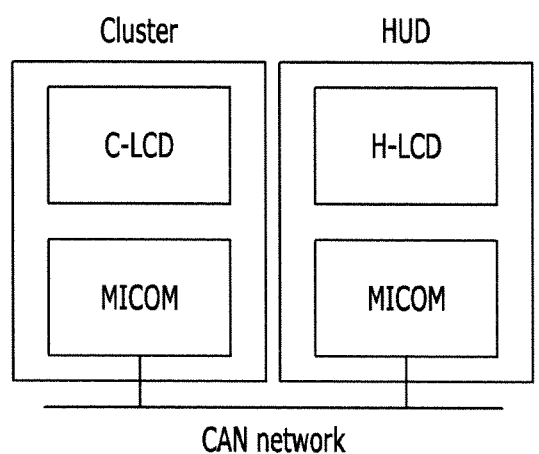
FIG. 1 is a drawing conceptually illustrating an example of a vehicle information display device.

In order to sufficiently understand the present disclosure and the object achieved by embodying the present disclosure, the accompanying drawings illustrating exemplary embodiments of the present invention and contents described in the accompanying drawings are to be referenced.

Hereinafter, the present inventive concept will be described in detail by describing exemplary embodiments of the present inventive concept with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are used only in order to describe specific exemplary embodiments rather than limiting the present inventive concept. Singular forms are to include plural forms unless the context clearly indicates otherwise. It will be further understood that the terms "include" or "have" used in the present specification specify the presence of features, numerals, steps, operations, components, parts mentioned in the present specification, or a combination thereof, but do not preclude the presence or addition of one or more other features, numerals, steps, operations, components, parts, or a combination thereof.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A cluster or a head-up display device (HUD) is a vehicle information display device, and thus, there may be similarities between the cluster and the HUD, such as representation contents and installation location. Therefore, when the cluster is integrated with the HUD, the integrated device may have advantages.

As a display device (e.g., a liquid crystal display (LCD)) has high resolution, a single LCD device may have sufficient resolution which both the cluster and the HUD require. A Full High Definition (FHD) LCD which is a high-resolution LCD that may have resolution of 1920×1080 is being mass produced. The FHD LCD may have a size of 4-5 inches and be applied to a latest smart phone. Further, an Ultra High Definition (UHD) which is a high-resolution LCD that may have resolution of 3840×2160 is scheduled to be developed in the future.

FIG. 1 is a drawing conceptually illustrating an example of a vehicle information display device.

Referring to FIG. 1, two LCD devices (C-LCD and H-LCD) execute independent functions. In other words, a single LCD (C-LCD or H-LCD) performs a single function. The C-LCD displays cluster information and the H-LCD displays HUD information. A separate-type controller (MICOM) or a specific controller which controls the LCD is a display controller and controls the C-LCD or the H-LCD. The separate-type controller (MICOM) is connected to a controller area network (CAN) which is a vehicle network.

Figure 2:
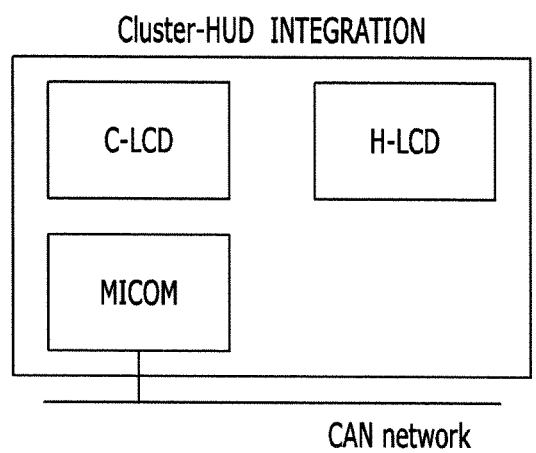
FIG. 2 is a drawing conceptually illustrating another example of a vehicle information display device.

FIG. 2 is a drawing conceptually illustrating another example of a vehicle information display device.

Referring to FIG. 2, two LCD devices (C-LCD and H-LCD) execute independent functions. A combined controller (MICOM) controls two LCDs (C-LCD and H-LCD) to drive and display cluster information and HUD information. The combined controller (MICOM) is connected to a controller area network (CAN) which is a vehicle network.

Figure 3:
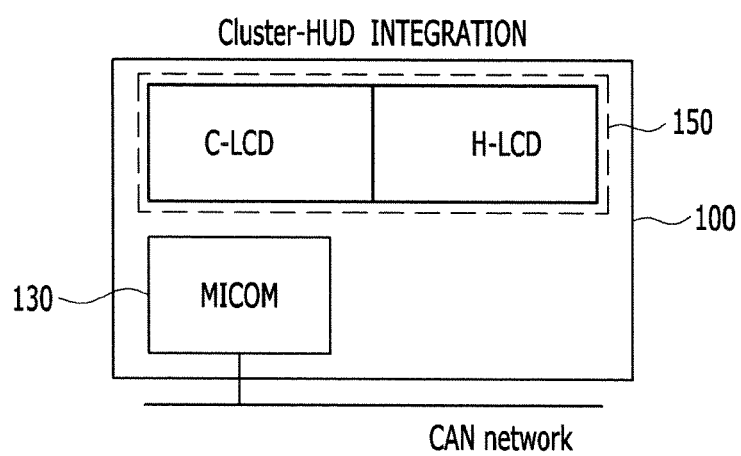
FIG. 3 is a diagram conceptually describing an integrated cluster and head-up display device (HUD) for a vehicle according to an exemplary embodiment of the present inventive concept.

FIG. 3 is a diagram conceptually describing an integrated cluster and head-up display device (HUD) for a vehicle according to an exemplary embodiment of the present inventive concept.

Referring to FIG. 3, an integrated cluster and head-up display device (HUD) 100 may include a cluster device and a head-up display device. The integrated device 100 may include a display device 150 which executes functions in a separated area (C-LCD or H-LCD) or a divided area, and a controller 130 which controls operation of the display device 150. The controller 130 is connected to a controller area network (CAN) which is a vehicle network.

The head-up display (HUD) device may provide vehicle information such a vehicle speed, a travel distance, an engine revolutions per minute (RPM), or route information to a driver of the vehicle by reflecting an image to a front windshield or a combiner of the vehicle. The cluster device may provide vehicle state information, vehicle alarm information, or vehicle dashboard information to the driver. The HUD device and the cluster device may provide vehicle information (or display contents), such as turn-by-turn (TBT) navigation, a warning, or driving information.

For example, the display device 150 may be an LCD device and the controller 130 may be a microcomputer (MICOM). In the LCD device 150, C-LCD may indicate an area which displays cluster information and H-LCD may indicate an area which displays HUD information.

For example, the present invention may be a system which includes a screen including two display areas (cluster information area and HUD information area) formed by a common LCD display device 150, by using a high-resolution LCD having a size of 4 to 5 inches which may be applied to the vehicle. A single display device 150 may be controlled by a single controller 130, and thus display of contents, processing of vehicle information, and the like may be executed by the single controller 130. Accordingly, the present disclosure may reduce a load of the vehicle network when compared with a separate-type system having two controllers as in FIG. 1.

The present disclosure may include different optical paths according to the separated area of the single display device 150, and therefore, it may perform a cluster function and a HUD function by dividing the cluster function and the HUD function. The display device 150 which may be, for example, a high-resolution LCD, may perform the cluster function and the HUD function in separate areas. Resolutions of the HUD information and the cluster information may be variably changed in accordance with change of the separate areas. In addition, because the present invention may include the high-resolution LCD, it may provide contents that require high resolution according to a user's settings or the driver's settings.

Figure 4:
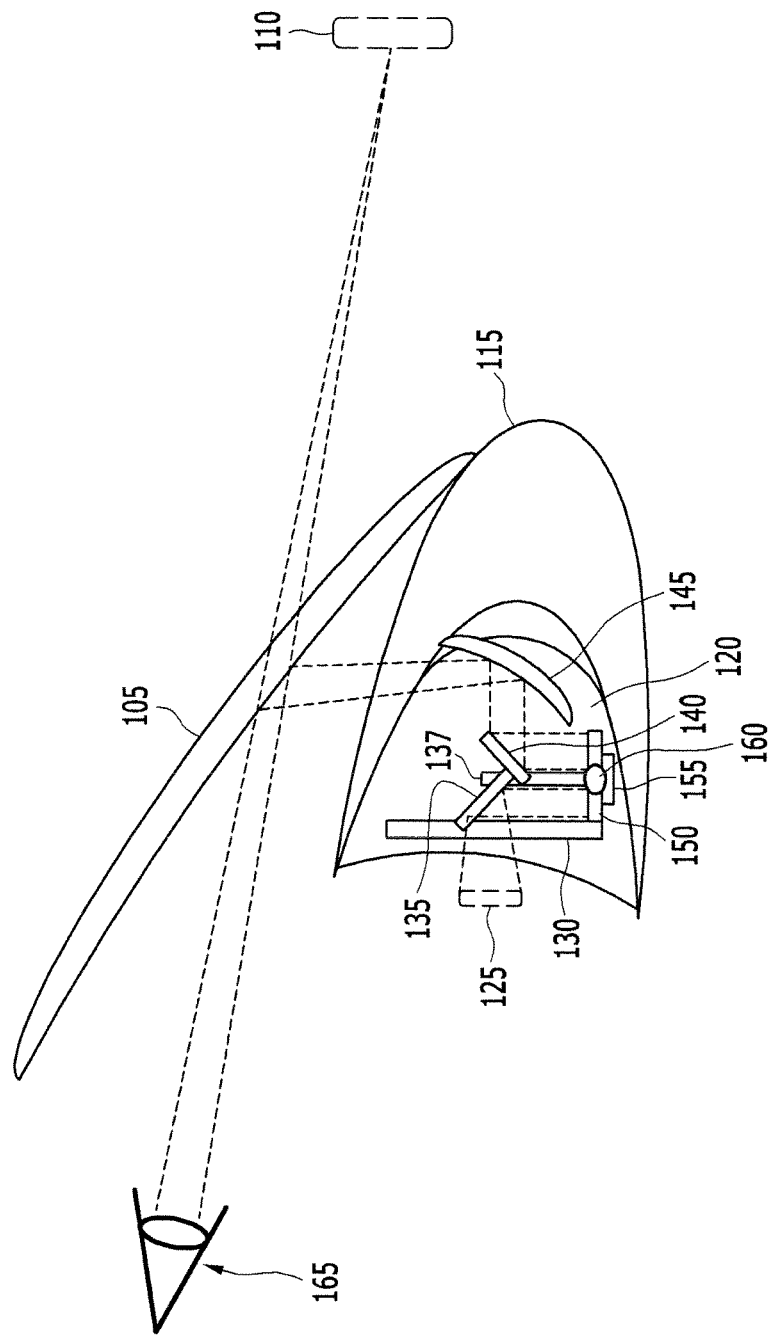
FIG. 4 is a vertical cross-sectional view describing an integrated cluster and head-up display device (HUD) for a vehicle according to an exemplary embodiment of the present inventive concept.
Figure 5:
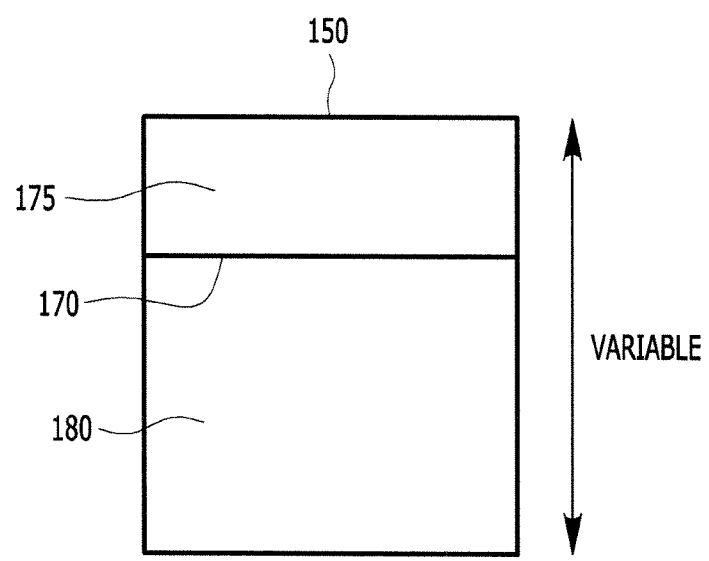
FIG. 5 is a plan view representing a display device illustrated in FIG. 4.

FIG. 4 is a vertical cross-sectional view describing an integrated cluster and head-up display device (HUD) for a vehicle according to an exemplary embodiment of the present inventive concept. FIG. 4 may represent a more detailed device with respect to the integrated device 100 shown in FIG. 3. FIG. 5 is a plan view representing a display device illustrated in FIG. 4.

Referring to FIG. 4, an integrated cluster and head-up display device (HUD) for a vehicle may include a controller (a control portion) 130, a first optical mirror (a first light mirror) 145, a second optical mirror 140, a third optical mirror 135, and the display device 150.

The integrated cluster and head-up display device (HUD) of the vehicle may be disposed in a second housing 120 which is installed in a first housing 115 and in front of the driver's seat. The first housing 115 may be installed in front of the driver's seat and connected to a windshield (or a front windshield) 105.

As shown in FIG. 5, the display device 150 may display by separating an entire display area of the display device 150 into a cluster information area 175 and a HUD information area 180 along a boundary portion 170. Both the cluster information and the HUD information may be indicated by reference number 160 in FIG. 4. Referring to FIGS. 4 and 5, when the third optical mirror 135 and the second optical mirror 140 move up and down in FIG. 5, the size of the cluster information area (cluster information display area) reflected by the third optical mirror 135 and the size of the HUD information area (HUD information display area) reflected by the second optical mirror 140 may be changed. The second optical mirror 140 and the third optical mirror 135 may be installed on a holder 137 disposed in the second housing 120. When the boundary portion (or a screen) 170 corresponding to a lower portion of the holder 137 is moved, size, or resolution of the cluster information area and size or resolution of the HUD information area may be changed, or the information areas may be disabled. The holder 137 disposed above the display device 150 may be moved by a motor (e.g., a step motor) installed on a side of the holder 137.

In another exemplary embodiment of the present inventive concept, the display device 150 may be moved from side to side in FIG. 4 by a motor within a position range in which the second optical mirror 140 and the third optical mirror 135 are disposed. As a result, the display device 150 may provide the cluster information of the display device 150 to the second optical mirror 140 and provide the HUD information of the display device 150 to the third optical mirror 135.

Through the movement by the motor, image size or resolution of the cluster information area and image size or resolution of the HUD information area may be changed, or the areas may be disabled. For example, the motor may be disposed in a lower portion of the display device 150 and be a step motor.

The display device 150 may selectively enable or disable the cluster information display area or the HUD information display area by using a variable area separation function. When the variable area separation function is used, it may be necessary to control a mirror for setting of the optical path. The mirror control may include control of the first optical mirror 145, the second optical mirror 140, and the third optical mirror 135 for adjusting a reflection angle of light.

For example, the display device 150 may be a high resolution LCD device which has, for example, resolution of 1920×1080, and may display an image or a video. The LCD device may include a backlight 155.

The controller 130 may control operations of the display device 150, the motor, the first optical mirror 145, the second optical mirror 140, and the third optical mirror 135. The controller 130, which is an integrated controller, may be implemented as a printed circuit board (PCB). The controller 130 may be coupled with a controller area network (CAN) which is a vehicle network.

The controller 130 may control the display device 150 to deactivate the HUD information and display only the cluster information, or may control the display device 150 to deactivate the cluster information and display only the HUD information.

The controller 130 may adjust resolution or size of the HUD information area of the display device 150 and resolution or size of the cluster information area of the display device 150. The display device 150 may have selective resolution. That is, the controller 130 may control the display device 150 to display the cluster information at low resolution (first resolution) and display the HUD information at high resolution (second resolution higher than the first resolution).

The user of the integrated cluster and head-up display device for the vehicle may set resolution of the HUD information area or the cluster information area through a cluster user settings mode (USM) of the controller 130. A single display operation may be performed by setting resolution of the display device 150 as maximum resolution through the cluster USM mode. The controller 130 may be linked with a smart phone which includes a high-resolution LCD and that may control the controller 130.

The controller 130 may control the display device 150 to assign the cluster information area having maximum resolution to an entire display area. When the display device 150 is a high resolution LCD, the display device 150 may display high-class contents, such as navigation information, a video, a picture, etc. When the display device 150 displays only the cluster information, the HUD function of the display device 150 may be disabled.

The controller 130 may control the display device 150 to assign the HUD information area having the maximum resolution to the entire display area. When the display device 150 is a high resolution LCD, the display device 150 may display high-class contents such as navigation information (e.g. turn-by-turn (TBT) information, actual image information about an intersection, etc.) or a video such as an around view monitor (AVM). When the display device 150 displays only the HUD information, the cluster function of the display device 150 may be disabled.

The controller 130 may divide resolution of the entire display area in the display device 150 so that the controller 130 may control the display device 150 to integratedly display the HUD information and the cluster information in accordance with display contents of the HUD and the cluster. For example, the display device 150 may display the cluster information at low resolution (e.g., 1280×720) and display the HUD information at high resolution (e.g., 1920×1080). In addition, the display device 150 may display highly perceived contents by changing resolution when the vehicle is traveling. For example, the highly perceived contents may be high-resolution contents displayed when warning information about the vehicle occurs.

As described above, the single controller 130 may provide display contents which may be shared by the cluster and the HUD to the display device 150. Accordingly, the controller 130 may be implemented at a low cost, and it is possible to reduce a load of the vehicle network.

The first optical mirror 145 may reflect the HUD information of the display device 150 to the front windshield 105. The HUD information reflected by the windshield 105 may be provided to the driver. The driver may see a virtual HUD information (a virtual image of a HUD area) 110 in front of the windshield 105. The first optical mirror 145, which is a second reflecting mirror for the HUD, may change the optical path by using a spherical lens such as a concave mirror. As a result, the first optical mirror 145 may spread the HUD image to the windshield 105.

The second optical mirror 140 may reflect the HUD information of the display device 150 to the first optical mirror 145. The second optical mirror 140, which is a first reflecting mirror for the HUD, may be, for example, a folding mirror. The second optical mirror 140 may totally reflect the HUD image to the first optical mirror 145 by first changing the optical path.

The third optical mirror 135, which is a reflective lens, may display a virtual cluster information (a virtual image of a cluster area) 125 which is provided to the driver or the user by reflecting the cluster information of the display device 150.

When the second optical mirror 140 and the third optical mirror 135 are moved on the display device 150 by the motor, the second optical mirror 140 may reflect the HUD information and the third optical mirror 135 may reflect the cluster information.

As described above, the present disclosure may separate areas for displaying the cluster information and the HUD information by utilizing a single display device such an LCD, display the cluster information by using a reflecting mirror for the cluster information, display the HUD information by using reflecting mirrors for the HUD, and variably select resolution of the cluster area and resolution of the HUD area by using the motor.

A method of controlling the integrated cluster and head-up display device for the vehicle may be described as follows with reference to FIGS. 3-5. The method of controlling the integrated cluster and head-up display device of the vehicle may be applied to the integrated device 100 shown in FIG. 3 or FIG. 4, and may include a control step, a first reflection step, a second reflection step, and a third reflection step.

In the control step, the controller 130 may control the display device 150 to display by separating an entire display area of the display device 150 into a cluster information area 175 and a head-up display (HUD) information area 180. The display device 150 may be, for example, a high-resolution LCD device.

In another embodiment of the present inventive concept, the controller 130 may control the display device 150 to deactivate the HUD information and display only the cluster information. The controller 130 may control the display device 150 to deactivate the cluster information and display only the HUD information. The controller 130 may also adjust resolution of the cluster information area and resolution of the HUD information area. In another embodiment, the controller 130 may control the display device 150 to display the cluster information at low resolution and display the HUD information at high resolution. The controller 130 may adjust size of the cluster information area and size of the HUD information area.

According to the first reflection step, the first optical mirror 145 may provide the HUD information to the windshield 105 by reflecting the HUD information. According to the second reflection step, the second optical mirror 140 may send the HUD information to the first optical mirror 145 by reflecting the HUD information. According to the third reflection step, the third optical mirror 135 may display or largely display the virtual cluster information by reflecting the cluster information.

In another embodiment, when the second optical mirror 140 and the third optical mirror 135 are moved on the display device 150 by the motor, the second optical mirror 140 may reflect the HUD information and the third optical mirror 135 may reflect the cluster information.

The controller 130 of the control step may control operations of the display device 150, the motor, the first optical mirror 145, the second optical mirror 140, and the third optical mirror 135.

The components, or "~unit", or block, or module which is used in the present exemplary embodiment may be implemented in software such as a task, a class, a subroutine, a process, an object, an execution thread, or a program which is performed in a predetermined region on the memory, or hardware such as a field programmable gate array (FPGA) or an application-specific integrated circuit (ASIC), and may be performed in a combination of the software and the hardware. The components, '~part', or the like may be embedded in a computer-readable storage medium, and some thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present inventive concept. Accordingly, the actual technical protection scope of the present disclosure must be determined by the spirit of the appended claims.

What is claimed is:

1. An integrated cluster and head-up display device for a vehicle, comprising:
   a display device having a display area including an area of cluster information and an area of head-up display (HUD) information;
   a controller configured to control an operation of the display device;
   a first optical mirror which reflects the HUD information to a windshield;
   a second optical mirror which reflects the HUD information to the first optical mirror; and
   a third optical mirror which displays virtual cluster information by reflecting the cluster information,
   wherein, when the second optical mirror and the third optical mirror are moved on the display device by a motor, the second optical mirror reflects the HUD information and the third optical mirror reflects the cluster information, and
   wherein the controller controls the display device to deactivate the HUD information and display only the cluster information.

2. The integrated device of claim 1, wherein the controller adjusts a resolution of the cluster information area and a resolution of the HUD information area.

3. The integrated device of claim 2, wherein the controller controls the display device to display the cluster information at a low resolution and display the HUD information at a high resolution.

4. The integrated device of claim 2, wherein the controller adjusts a size of the cluster information area and a size of the HUD information area.

5. The integrated device of claim 1, wherein the display device comprises a liquid crystal display (LCD) device.

6. An integrated cluster and head-up display device for a vehicle, comprising:
   a display device having a display area including an area of cluster information and an area of head-up display (HUD) information;
   a controller configured to control an operation of the display device;
   a first optical mirror which reflects the HUD information to a windshield;
   a second optical mirror which reflects the HUD information to the first optical mirror; and
   a third optical mirror which displays virtual cluster information by reflecting the cluster information,
   wherein, when the second optical mirror and the third optical mirror are moved on the display device by a motor, the second optical mirror reflects the HUD information and the third optical mirror reflects the cluster information, and wherein the controller controls the display device to deactivate the cluster information and display only the HUD information.

\* \* \* \* \*